United States Patent Office 3,340,334
Patented Sept. 5, 1967

3,340,334
PROCESS FOR ATOMIZING MOLTEN MATERIAL
Klaus Feldmann, Hermulheim, near Cologne, Johann Cziska, Hurth, near Cologne, and Klaus Frank, Knapsack, near Cologne, Germany, assignors to Knapsack Aktiengesellschaft, a corporation of Germany
Filed Nov. 25, 1964, Ser. No. 413,788
Claims priority, application Germany, Nov. 28, 1963, K 51,485
10 Claims. (Cl. 264—12)

The present invention is concerned with a process and an annular nozzle device for making granular particles from molten material by means of gases and/or vapors and/or water.

Granulated material, especially granulated metal, can be prepared from molten material by means of water on a granulating plate or granulating groove. Pulverulent matter can be produced with an annular nozzle of the type wherein an atomizing agent is caused to flow countercurrently and in cone-shaped fashion to a jet of molten material caused to flow through the nozzle in free fall. The atomizing agent will leave the nozzle in either separate jets converging at a common point of intersection and convergent to the jet of molten material, or will leave the nozzle through an annular slit so as to form a cone-shaped shell.

The single jets of the atomizing agent may have a circular cross-sectional area or e.g. an oval-shaped cross-sectional area. In this latter case, the mouthpiece or the whole outflow nozzle can be turned out of position with various effects being conferred upon the jet of the melt to be atomized which under otherwise identical conditions especially influence the size and shape of the resulting atomized particles.

An annular nozzle device of the type wherein the atomizing agent can also be introduced tangentially with respect to the nozzle structure has already been described. This means that any particle of the atomizing agent leaving the nozzle will travel on a spiral line to the apex of the resulting cone shell. In order to prevent portions of the atomized melt from being flung back against the nozzle and from obstructing it, the free-falling jet of a metal melt is guided so as to form an angle of at most 20° with a generatrix of the cone shell.

However, the results obtained with conventional processes and devices were unsatisfactory especially as regards the proportion in which a given preferred grain fraction could be obtained.

The present invention now provides an endless annular hollow structure, arranged in a substantially horizontal plane, i.e. an annular nozzle structure, which has bores or nozzles disposed in its lower portion for distributing an atomizing agent continuously introduced into the said annular nozzle structure and for producing an atomization cone. These bores or nozzles will issue downwardly converging atomizing agent jets and will cause these jets and an atomization melt jet, which flows in free fall through an annular central aperture in the annular nozzle structure, to converge at a common point of intersection.

As against conventional devices, the present invention provides an annular nozzle structure, wherein the atomizing agent jets and the free-falling atomization melt jet converge at a point of intersection located eccentrically with respect to the geometrical axis of the atomization cone base.

The atomizing agents include gaseous and liquid media, e.g. gases and/or vapors and/or water.

The substances to be atomized include metal or metal alloy melts, especially ferrosilicon melts. Melts of non-metallic substances, e.g. slags, fertilizer salts or the like can also be atomized in accordance with the present invention.

Various means can be used to produce an eccentric atomization cone, which primarily include the fall in pressure the flowing atomizing agent undergoes on bridging the space between the single outflow openings through which the atomizing agent jets issue. The action exerted by the fall in pressure on the flowing medium can be controlled by causing the single outflow openings to issue different proportions of atomizing agent. An eccentric atomization cone can ultimately be produced by causing the atomizing agent to leave the annular nozzle structure at outlet angles distinct from each other with respect to the atomization cone base.

The device suitable for use in carrying out the process of the present invention comprises the annular nozzle structure already mentioned above which has nozzle-shaped bores or nozzles distributed in annular fashion in its lower portion. In one constructional form of the present device, the axes of the bores or nozzles will form different angles with the vertical line and converge at a point eccentric with respect to the geometrical center axis of the annular nozzle structure.

In another constructional form of the present device, the annular nozzle structure is provided with a single or with a plurality of pipe connections spaced at irregular arc distances and serving to supply the atomizing agent.

These two latter features can also be used in combination and e.g. with merely one connection pipe supplying the atomizing agent. In this case, however, on the arc opposite the connection pipe the center axes of the nozzle-shaped bores or nozzles and the vertical will form angles other, e.g. smaller angles than in the immediate vicinity of the connection pipe.

According to a further feature of the present invention, the nozzle-shaped bore or nozzle outlets for the atomizing agent have diameters distinct from each other. For example, with merely one connection pipe, the outlet diameters on the arc opposite the connection pipe have other e.g. smaller values than in the immediate vicinity of the connection pipe.

With the center axis of the melt jet supplied through the central aperture of the annular nozzle structure the center axis of each nozzle-shaped bore or nozzle will form a cutting angle at least partially greater than about 20°.

With the center axis of the melt jet the center axis of each bore or nozzle outlet for the atomizing agent will form a vertical plane.

According to a still further feature the vertical plane projected through the center axis of a bore or nozzle outlet for the atomizing agent deviates by an angle β of about 1 to 10° from the central axis of the melt.

The number of outlet openings for the atomizing agent varies between about 30 to 100.

The hole circle provided with the outlet openings for the atomizing agent has a diameter of at least 90 mm.

In a modified form of construction, the device comprises two or more annular nozzle structures with decreasing outside diameters and with central apertures arranged concentrically one above the other and/or fit into one another with separate supply openings for the atomizing agent.

The connection pipes allotted to any of the annular nozzle structures are disposed so as to be vertically coplanar.

Alternatively, the connection pipes allotted to a single annular nozzle structure may be arranged in staggered relationship.

The annular nozzle device designed in accordance with the present invention is shown diagrammatically in the accompanying drawings, wherein identical reference numerals denote identical parts.

FIG. 4 is a side elevational view of an annular nozzle device having two connection pipes opposite each other, of which the axes are in parallel relationship and coplanar with the geometrical center axis of the annular nozzle structure;

FIG. 5 is a top plan view of the annular nozzle device of FIG. 4;

FIG. 6 is a side elevational view of an annular nozzle device having three connection pipes spaced at regular distances along the arc with the formation of a blanketing curve.

FIG. 7 is a top plan view of the annular nozzle device of FIG. 6;

FIG. 8 is a side elevational view of a nozzle structure comprising two annular nozzle devices fit into one another;

FIG. 9 is a top plan view of the nozzle structure shown in FIG. 8;

FIG. 10 represents grain characteristics (grain size and grain size distribution) obtained under varied conditions and plotted on a Rosin-Rammler diagram.

The annular nozzle device as shown in FIGS. 1 and 2 substantially comprises a horizontally disposed hollow structure 1, i.e. the annular nozzle structure having a recessed circular central aperture 2. The lower edge 4 of the circular center aperture 2 is bevelled and provided with bores 5 or nozzles disposed substantially in radial relationship with respect to the central aperture. At least 30 to 100 bores or nozzles are provided, the diameters of the hole circle being at least 90 mm. wide.

In conventional devices of similar design, a point of intersection situated on the geometrical center axis of the annular central aperture 2 is common to the issuing jets of the atomizing agent and the axis of the jet of the melt to undergo atomization, which is caused to flow in free fall through the annular aperture 2. As opposed thereto, in the device of the present invention, the point of intersection 21 of melt 20 discharged in free fall about centerline 6 from nozzle 22 below tank 23 is situated eccentrically at a distance 24 with respect to the geometrical center axis 25 of the central aperture 2 in the annular nozzle device 1. The centerline 6 of melt jet 20 and geometrical center axis 25 of central aperture 2 are similarly shown in the other figures of the drawing.

Three different means can be used to produce the eccentric point of intersection common to the convergent jets of the atomizing agent, which comprise:

(1) causing the atomizing agent flowing into the annular hollow structure 1 and issuing through the bores or nozzles to undergo a fall in pressure and making use of this phenomenon with the atomizing agent exerting different effective pressure rates on the single outflow openings;
(2) regulating the proportion of atomizing agent issuing through the separate bores or nozzles, and
(3) causing the individual jets of the atomizing agent to issue in different directions.

In the annular nozzle structure according to the present invention these three means can be taken alone or in combination with one or both of the two other means.

In the method of construction shown in FIGS. 1 and 2, the annular nozzle device is provided with a single connecting pipe 3 serving to introduce the atomizing agent into the annular hollow structure 1. The effective overpressure of the flowing atomizing agent inside the annular nozzle structure 1 therefore reaches a maximum in the vicinity of connection pipe 3 and a minimum at the portion of the annular nozzle structure 1 which is diametrically opposite the connection pipe 3, so that the distribution of pressure can be termed to be asymmetrical. As a result thereof, the point of intersection common to the jets of the atomizing agent and the jet of the melt to be atomized, which is caused to flow in free fall through the center aperture 2 of the annular nozzle structure 1, will be formed at a position eccentric with respect to the central aperture 2 of the annular nozzle structure 1 rather than concentric thereto.

In FIG. 1, centerline 6 denotes the direction of the axis of the free-falling melt jet 20; jet centerline 7 indicates the direction of an atomizing jet forced to flow through the nozzle at a higher pressure, and jet centerline 8 denotes the direction of an atomizing jet forced to flow through the nozzle at a lower pressure. With centerline 6 of the melt jet 20, jet 7 will form an angle $\alpha_1$, and jet 8 an angle $\alpha_2$. Jet 7 forms angle $\alpha_3$ with plane 27 through the horizontal center of all outlet openings 5, and jet 8 forms angle $\alpha_4$ with plane 27. Similar angles (not shown) could be illustrated in corresponding figures.

FIG. 2 illustrates that atomizing agent jets 7 and 8 as well as the jets of the atomizing agent issuing through all the other bores 5 or nozzles focus at a common point of intersection, the reference numerals 6 and 7 or 6 and 8, respectively, defining vertical planes which cross in the axis 6 of the melt jet.

In a slightly modified form of construction of the annular nozzle device as shown in FIG. 3, vertical planes are again drawn through the axes of the atomizing agent jets, but unlike in FIG. 2, the planes do not intersect at a vertical straight line but are turned by an angle $\beta$ out of line with respect to the axis of the melt jet, and as a blanketing curve they will form a hollow cylinder around the axis of the melt jet. The atomizing agent and particles torn off from the previously coherent melt jet flow downwardly on a helical line. In FIG. 3, the reference numeral 8′ defines the direction of flow of the atomizing agent in FIG. 2. The true jet in FIG. 3 turned through an angle $\beta$ flows in the direction indicated by reference numeral 8″. $\beta$ defines an angle of 1 to 10°.

As indicated in FIG. 1, the angles $\alpha_1$ and $\alpha_2$ are distinct from each other at the point of intersection common to the atomizing agent jets 7 and 8 and the jet of the melt due to the means applied, e.g. asymmetrical pressure distribution. Contrary to prior art teachings holding that the cutting angle of an atomizing agent jet with a melt jet should not exceed a maximum angle of 20°, it has unexpectedly been found that in the device according to this invention the above angle may be designed without prejudice so as to encompass an angle greater than 20° which is advantageous for the structural dimensions of the device, but this must not necessarily be done.

In the method of construction shown in FIGS. 4 and 5, the annular nozzle device is provided with two connecting pipes 3 supplying the atomizing agent to the annular nozzle structure 1, which are disposed diametrically opposite to one another and in parallel relationship with the melt jet 6 issuing through the annular central aperture 2. As a result thereof, the pressure distribution in the annular nozzle structure 1 is changed, which implies adapting to such changed pressure conditions the cross-sectional areas of the bore or nozzle outlets for the atomizing agent jets and/or their axial directions so as to obtain an eccentric point of intersection common to the jet of the atomizing agent and the jet 6 of the melt.

Figure 4:
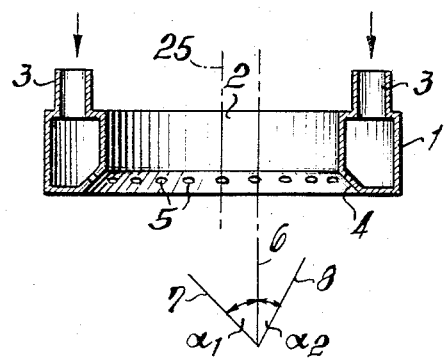
Figure 5:
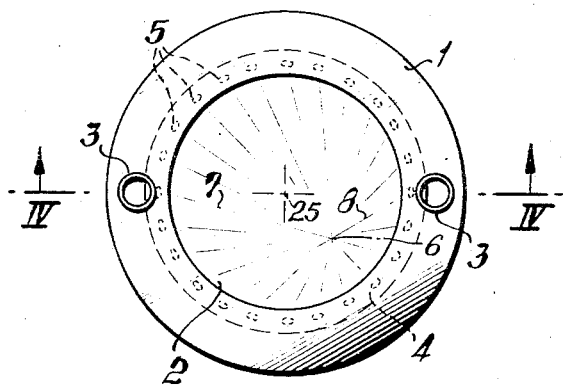
Figure 6:
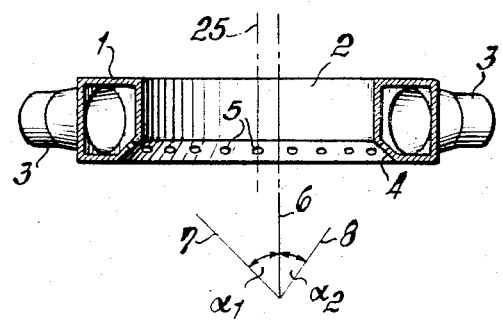
Figure 7:
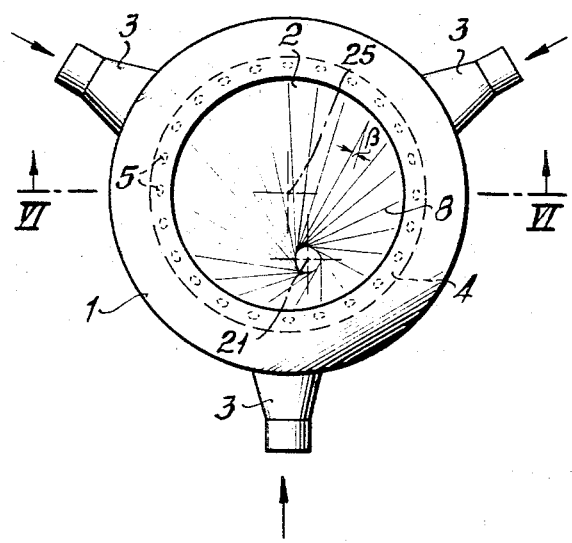

The same statements apply ot the mode of construction shown in FIGS. 6 and 7, wherein the annular nozzle device has three horizontally disposed connection pipes 3 which are spaced e.g. at regular distances along the arc or are spaced at irregular distances in a manner analogous to that shown in FIGS. 4 and 5. The number of connecting pipes is not limited to three. This arrangement which enables relatively large amounts of atomizing agent to be supplied per unit of time is preferably used in order to obtain a large atomization capacity (kg./hr.).

Figure 1:
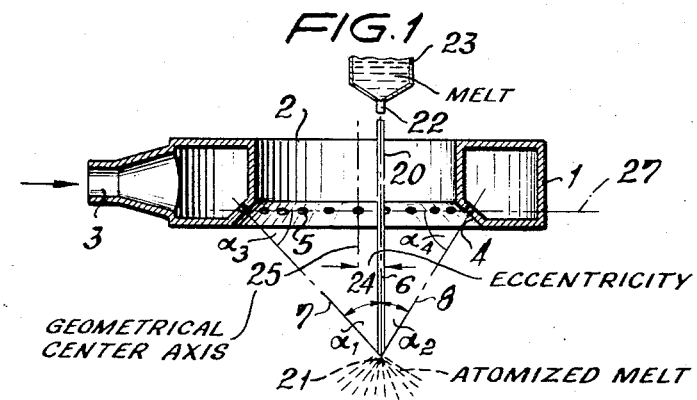
FIG. 1 is a side elevational view of an annular nozzle device with a single connection pipe.
Figure 2:
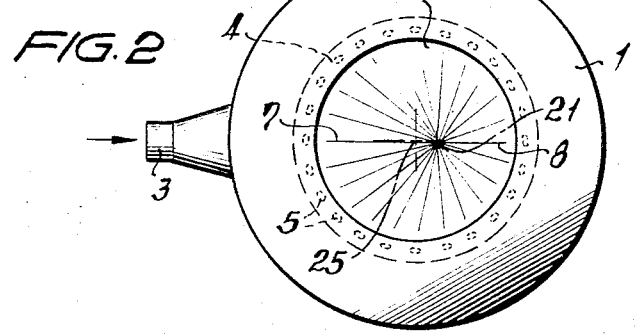
FIG. 2 is a top plan view of the annular nozzle device of FIG. 1.
Figure 3:
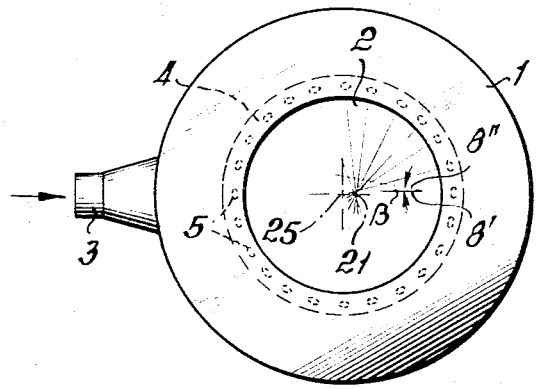
FIG. 3 is a top plan view of the annular nozzle device of FIG. 1 with the atomizing agent forming a blanketing curve rather than converging at a common point of intersection.
Figure 8:
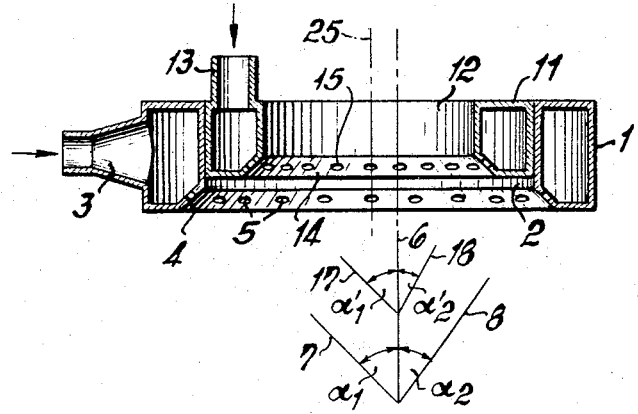
Figure 9:
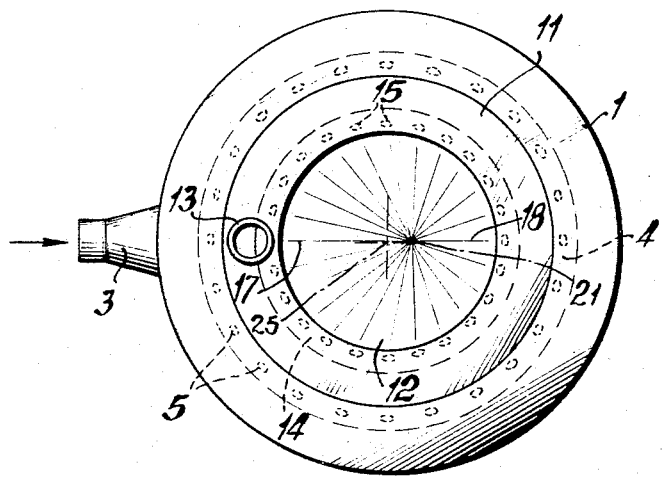

Favorable results will also be obtained with the arrangement shown in FIGS. 8 and 9 comprising the combination of two annular nozzle devices of the type described above. In this embodiment of the present invention, the outer annular nozzle device as shown in FIGS. 1 and 2 or 3 concentrically encircles a second inserted inner annular nozzle device consisting of nozzle structure 11 having a circular central aperture 12, a connecting pipe 13 for supplying the atomizing agent, and a lower bevelled edge 14 (of central aperture 12) with the bores 15 or inserted nozzles. The outer and inner annular nozzle device can be fed separately with atomizing agent. It is also possible to feed each of the two nozzle structures with a different medium, i.e. to feed nozzle 11 e.g. with steam serving as the atomizing agent, and to feed nozzle 1 with an inert gas serving as a protective gas.

The points of intersection of jets $\alpha_1$ and $\alpha_2$ issuing through the outer nozzle structure 1 and the points of intersection of jets 17 and 18 issuing through the inner nozzle structure 11 with the cutting angles $\alpha'_1$ and $\alpha'_2$ lie vertically one above the other on axis 6 of the melt jet.

The annular nozzle device designed in accordance with the present invention can be used for atomization of the most varied substances, e.g., slags or fertilizer salts, etc. and more especially metals and metal alloys. The present invention offers the special advantage that a single annular nozzle device permits making granular matter consisting of grains with a diameter of up to 25 mm. by changing the pressure under which the atomizing agent is supplied, i.e. by modifying the supply of energy and the diameter of the metal jet. By modifying the eccentric position of the point of intersection common to the atomizing agent jets and the melt jet, it is possible to influence the degree of grain size distribution so as to fairly substantially exclude the formation of grains having a size outside the desired range (cf. Table 2 below).

Various applications call for grains having a fairly small number of pores, i.e., for fairly compact material having a fairly smooth rather than a grained or spattered surface area (cf. Table 3 below).

It has already been reported in literature that the grain structure is decisively influenced especially by the viscosity and surface tension of the melt. The viscosity can be influenced especially by the degree of superheating while the surface tension can be modified by alloying the melt with certain elements. Iron melts admixed, e.g., with boron and titanium produce improved grain structures, and iron-silicon alloys can be transformed with an annular nozzle device and with an Al-content of 0.08 to 0.3% being maintained into powder consisting of substantially ideal-shaped spherical particles. The atomization of an iron-silicon alloy containing 14% Si, 0.5–3.0% Al, less than 0.5% Cu and less than 0.5% Ni through a conventional annular nozzle device results in the formation of grain structures having a grained or spattered surface area. Atomization of an identical melt through the annular nozzle device designed in accordance with the present invention results in grain structures having substantially an ideal spherical shape. This indicates that the grain structure and nature are also a function of the mode used for comminuting the melt.

EXAMPLES

The following alloys were investigated to compare the efficiency of the annular nozzle device designed in accordance with the present invention with nozzles of conventional design.

TABLE 1.—COMPOSITION OF ALLOYS ATOMIZED

| Alloy constituents | Literature specifications | Test alloy 1 | Test alloy 2 | Test alloy 3 |
| --- | --- | --- | --- | --- |
| Silicon, percent | 14.05 | 14.9 | 14.9 | 73.5 |
| Carbon, percent | 0.04 | 0.2 | 0.2 | 0.02 |
| Manganese, percent | 0.26 | 0.5 | 0.5 | 0.19 |
| Aluminum, percent | (¹) | 0.51 | 0.10 | 0.90 |
| Iron, percent | (²) | (²) | (²) | (²) |

¹ Not specified.
² Balance.

The degree of grain distribution obtained with the annular nozzle structure designed in accordance with the present invention was compared with the degree of grain distribution obtained with a conventional device. The data obtained are indicated in the following Table 2.

TABLE 2.—GRAIN DISTRIBUTION CURVES

| Grain size, mm. | Literature specifications, percent | Annular nozzle structure, percent | |
| --- | --- | --- | --- |
| | | Test alloy 1 | Test alloy 2 |
| >0.84 | 20 | 0.0 | 97.0 |
| 0.297–0.84 | 16 | 17.0 | 3.0 |
| 0.148–0.297 | 12.4 | 42.0 | 0.0 |
| <0.149 | 45 | 41.0 | 0.0 |
| | Balance not specified | | |

In Table 1, the column "literature specifications" refers to an alloy composition reported in literature, and in Table 2 it refers to the degree of grain distribution obtained with the said alloy and with the use of the device described above.

Table 2 indicates clearly the improvement realized with the annular nozzle device designed in accordance with the present invention, which permits the preparation of particles having a much narrower grain size range than those obtained with a device other than described above.

Figure 10:
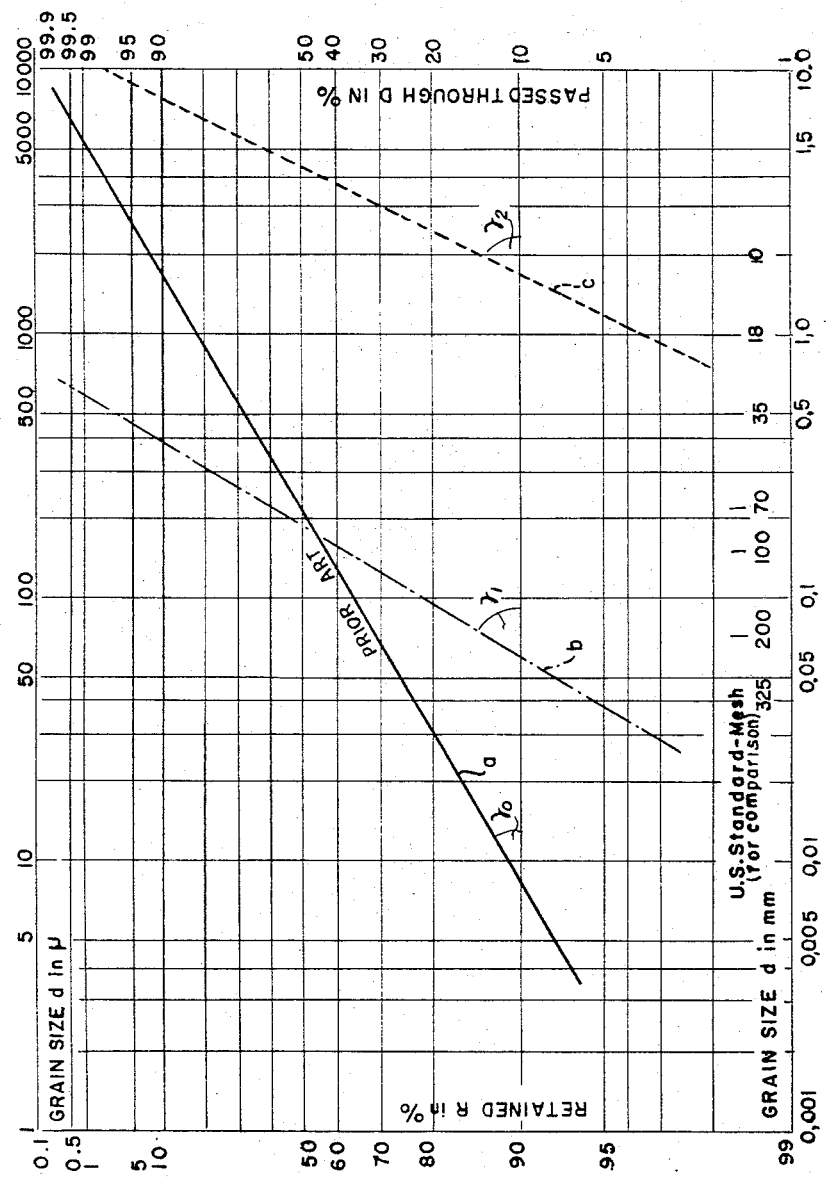

This becomes especially distinct when the degrees of grain size distribution are plotted on a Rosin-Rammler diagram (cf. FIG. 10). According to the authors, the degree of grain size distribution is plotted as a straight line, which is termed "screen analysis curve." The different results obtained by atomization through the annular nozzle device structure while using water, gases and/or vapors as the atomizing agent, and obtained by atomization with the help of a liquid atomizing agent as proposed in literature become most obvious in the varying order of magnitude of the inclination angle formed between the abscissa and the respective screen analysis curves $a$, $b$ and $c$. The full screen analysis curve $a$ with the inclination angle $\gamma_0$ belongs to the alloy specified in Tables 1 and 2 under "literature specifications" and is obtained with a conventional device. The dash-dotted screen analysis curve $b$ with the inclination angle $\gamma_1$ and the dotted screen analysis curve $c$ with the inclination angle $\gamma_2$ belong to test alloys 1 and 2 of Tables 1 and 2, and they indicate both that the annular nozzle device designed in accordance with the present invention permits the material to be graded as early as during atomization.

In other words, the annular nozzle device of the present invention enables the production, e.g., of grains having a diameter of up to 0.6 mm. In combination with gases and/or vapors maintained under low pressure, e.g., under 0.1 to 0.5 kg./cm.² excess pressure, which serve as the atomizing agent, the above annular nozzle device structure also enables the production of particles having a grain size, e.g., of 1 to 15 mm. The proportion of grains smaller than 1 mm. can be neglected as being smaller than 1% of the total grain quantity. The screen analysis curve $\gamma_2$ in FIG. 10 exemplifies for the production of particles having a grain size of 0.5 to 10 mm. that any particles smaller or larger than indicated above are respectively obtained in a proportion of about 1%.

TABLE 3.—COMPARISON OF SPECIFIC GRAVITIES

| Atomization means | Alloy | Spec. gravity of alloy | <0.06, mm. | 0.06–0.1, mm. | 0.1–0.2, mm. | 0.3–0.5, mm. | 0.5–1.0, mm. | 1–2, mm. | 2–4, mm. | 4–6, mm. |
|---|---|---|---|---|---|---|---|---|---|---|
| Annular nozzle | No. 1 | 6.7 | 6.7 | 6.57 | 6.48 | | | | | |
| Annular slit nozzle | No. 1 | 6.7 | 6.7 | 6.67 | 6.63 | | | | | |
| Granulating plate | No. 3 | 3.3 | | | | 3.2 | 3.19 | 3.08 | 3.06 | 2.89 |
| Annular nozzle device | No. 3 | 3.3 | | | | 3.3 | 3.28 | 3.2 | 3.18 | 3.16 |

It has already been mentioned above that conventional atomizing methods may result in the formation of partially porous grains which may impair intended application. The annular nozzle device structure designed in accordance with the present invention unexpectedly obviates substantially this disadvantage with the formation of substantially compact grains. The specific gravity, for example, can serve as a measure determining the volume of the pores. Table 3 above shows that the annular nozzle device structure of the present invention produces particles having a specific gravity in all grain size grades approximately identical with that of the compact alloy. On the other hand, devices other than described above will produce grains, especially coarser grains, with a diminished apparent specific gravity, which can be considered to serve as a measure determining the larger pore volume included in these grains.

The annular nozzle device structure of the present invention enables the production of substantially compact grains within very narrow grain size limits by simple modification of the working conditions.

What is claimed is:

1. In the process for atomizing molten material with the aid of an atomizing agent which is caused to issue through separate outlet openings disposed in a circle in a plane having a geometrical center axis so as to form downwardly directed jets converging at a common point of intersection, the molten material being caused to flow as a free-falling jet through the point of intersection common to the atomizing agent jets, the improvement wherein the downwardly directed jets of the atomizing agent are caused to converge at a point of intersection located eccentrically with respect to said geometrical center axis and there intersecting with the jet of the molten material in a manner to cause atomization of the molten material.

2. A process as claimed in claim 1, wherein a gaseous medium is used as the atomizing agent.

3. A process as claimed in claim 1, wherein a liquid medium is used as the atomizing agent.

4. A process as claimed in claim 1, wherein the atomizing agent comprises vapors.

5. A process as claimed in claim 1, wherein the molten material is a melt of at least one substance selected from the group consisting of metals and metal alloys.

6. A process as claimed in claim 5, wherein the molten material is a ferrosilicon melt.

7. A process as claimed in claim 1, wherein the molten material is a melt of a non-metal substance.

8. A process as claimed in claim 7, wherein the molten material is a melt of at least one substance selected from the group consisting of slags and fertilizer salts.

9. A process as claimed in claim 1, wherein the atomizing agent inherently undergoes a fall in pressure on bridging the spaces between the separate outlet openings issuing single atomizing jets.

10. A process as claimed in claim 1, wherein the atomizing agent jets are caused to issue through outlet openings each having angles distinct from each other with respect to the plane of the outlet openings.

No references cited.

ROBERT F. WHITE, *Primary Examiner.*

J. R. HALL, *Assistant Examiner.*